(12) United States Patent
Huang et al.

(10) Patent No.: US 10,102,704 B2
(45) Date of Patent: Oct. 16, 2018

(54) BILL SOFTNESS RECOGNITION METHOD AND DEVICE

(71) Applicant: GRG Banking Equipment Co., Ltd., Guangzhou, Guangdong (CN)

(72) Inventors: Xiaoqun Huang, Guangdong (CN); Minjie Fang, Guangdong (CN); Xuyao Yue, Guangdong (CN); Yumei Lin, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/549,628

(22) PCT Filed: Aug. 10, 2015

(86) PCT No.: PCT/CN2015/086464
§ 371 (c)(1),
(2) Date: Aug. 8, 2017

(87) PCT Pub. No.: WO2016/138740
PCT Pub. Date: Sep. 9, 2016

(65) Prior Publication Data
US 2018/0061167 A1   Mar. 1, 2018

(30) Foreign Application Priority Data
Mar. 4, 2015   (CN) .......................... 2015 1 0097028

(51) Int. Cl.
*G07D 7/00* (2016.01)
*G07D 7/16* (2016.01)
(Continued)

(52) U.S. Cl.
CPC .............. *G07D 7/16* (2013.01); *G01G 17/02* (2013.01); *G07D 7/20* (2013.01)

(58) Field of Classification Search
CPC .. G01G 17/02; G06T 7/00; G06T 3/60; G06T 5/00; G07D 7/182
(Continued)

(56) References Cited

U.S. PATENT DOCUMENTS

| 4,365,508 | A | * | 12/1982 | Loftus | ...................... | G01N 3/20 |
| | | | | | | 73/159 |
| 6,574,569 | B1 | * | 6/2003 | Omata | ................... | G07D 7/182 |
| | | | | | | 156/64 |

(Continued)

FOREIGN PATENT DOCUMENTS

| CN | 1400567 A | 3/2003 |
| CN | 1576818 A | 2/2005 |

(Continued)

OTHER PUBLICATIONS

Written Opinion for Application No. PCT/CN2015/086464 dated Nov. 20, 2015.
(Continued)

*Primary Examiner* — Paul D Lee
*Assistant Examiner* — Mark Crohn
(74) *Attorney, Agent, or Firm* — Wolf, Greenfield & Sacks, P.C.

(57) ABSTRACT

A bill softness recognition method and a bill softness recognition device are provided. The method includes: receiving bills; extracting and separating the bills to make the bills enter a bill channel in a separated manner; capturing a single-bill image and a bill background image of each of the extracted bills; rolling the extracted bill to make the bill press a plurality of prearranged force sensors; acquiring effective force signals fed back from the force sensors; acquiring an inclination angle of the bill based on the single-bill image and the bill background image; determining, based on the inclination angle, the force sensor that is
(Continued)

pressed by the bill as an effective force sensor; and judging whether the effective force signal of the effective force sensor meets a preset softness condition, and determining the bill as a soft bill if the effective force signal meets the preset softness condition.

10 Claims, 6 Drawing Sheets

(51) Int. Cl.
*G01G 17/02* (2006.01)
*G07D 7/20* (2016.01)

(58) Field of Classification Search
USPC ........................................ 382/294, 235, 237
See application file for complete search history.

(56) References Cited

U.S. PATENT DOCUMENTS

| | | |
|---|---|---|
| 2003/0019715 A1 | 1/2003 | Yoshida et al. |
| 2005/0006285 A1 | 1/2005 | Watanabe et al. |
| 2009/0208088 A1 | 8/2009 | Saltsov et al. |
| 2014/0219540 A1* | 8/2014 | Drichel ............... G06K 9/3275 382/137 |
| 2015/0054212 A1 | 2/2015 | Fujihara et al. |

FOREIGN PATENT DOCUMENTS

| | | |
|---|---|---|
| CN | 101297328 A | 10/2008 |
| CN | 202205260 U | 4/2012 |
| CN | 202205261 U | 4/2012 |
| CN | 104346858 A | 2/2015 |
| CN | 104680642 A | 6/2015 |
| EP | 0 875 866 A2 | 11/1998 |
| EP | 2 680 238 A1 | 1/2014 |
| JP | 0875866 A2 * | 4/1998 ............... G07D 7/00 |
| JP | H11-219459 A | 8/1999 |
| JP | 2006-099647 A | 4/2006 |

OTHER PUBLICATIONS

International Search Report for Application No. PCT/CN2015/086464 dated Nov. 20, 2015.
Extended European Search Report for Application No. EP 15883791.4 dated Jun. 19, 2018.

* cited by examiner

BILL SOFTNESS RECOGNITION METHOD AND DEVICE

This application is the national phase of International Patent Application No. PCT/CN2015/086464, titled "BILL SOFTNESS RECOGNITION METHOD AND DEVICE", filed on Aug. 10, 2015, which claims priority to Chinese Patent Application No. 201510097028.6, titled "BILL SOFTNESS RECOGNITION METHOD AND DEVICE", filed with the Chinese State Intellectual Property Office on Mar. 4, 2015, both of which applications are incorporated herein by reference in their entireties.

FIELD

The present disclosure relates to the field of financial bill processing, and particularly to a bill softness recognition method and a bill softness recognition device.

BACKGROUND

At present, in a financial bill processing device, a thickness sensor, a magnetic sensor, an ultraviolet sensor, an infrared sensor, a touch image sensor or the like which may be adopted in an existing bill recognition module cannot rapidly recognize a softness degree of a bill with a small amount of information. Even the touch image sensor with a high definition can only distinguish between new bills and old bills. In practical applications, many new bills become soft due to moisture and the like, thereby affecting normal usage and circulation of the bills. The existing touch image sensor cannot recognize such soft new bills. In another existing recognition method, such soft bills are recognized by means of sounds. However, accuracy and stability of the recognition with sound are seriously affected by noises in various changeable frequencies generated by the machine itself and the surroundings.

SUMMARY

Embodiments of the present disclosure provide a bill softness recognition method and a bill softness recognition device, to solve the problem of low accuracy, low speed and poor anti-interference performance of the existing detection of bill softness.

A bill softness recognition method according to an embodiment of the present disclosure includes:
receiving bills;
extracting and separating the bills, to make the bills enter a bill channel in a separated manner;
capturing a single-bill image and a bill background image of each of the extracted bills;
rolling the extracted bill to make the bill press multiple prearranged force sensors;
acquiring effective force signals fed back from the force sensors;
acquiring an inclination angle of the bill based on the single-bill image and the bill background image;
determining, based on the inclination angle, the force sensor that is pressed by the bill as an effective force sensor; and
judging whether the effective force signal of the effective force sensor meets a preset softness condition, and determining the bill as a soft bill if the effective force signal meets the preset softness condition.

Optionally, the acquiring the effective force signals fed back from the force sensors may include:

acquiring original force signals generated by the force sensors in a process from that the bill starts to press the force sensors to that the bill leaves the force sensors; and
calculating the effective force signals of the force sensors based on the original force signals.

Optionally, the judging whether the effective force signal of the effective force sensor meets the preset softness condition, and determining the bill as a soft bill if the effective force signal meets the preset softness condition may include:
determining the bill as a soft bill if the effective force signal of each effective force sensor is less than the preset softness threshold;
determining the bill as a soft bill if the number of the effective force sensors of which the effective force signals are less than the preset softness threshold exceeds a half of the total number of the effective force sensors; or
determining the bill as a soft bill if the effective force signal of at least one effective force sensor is less than the preset softness threshold.

Optionally, the method may further include:
determining the bill as an abnormal bill if the effective force signal of at least one effective force sensor is greater than a maximum value for new bill.

Optionally, the method may further include:
picking out the soft bill and the abnormal bill.

A bill softness recognition device according to an embodiment of the present disclosure includes:
a receiving unit, configured to receive bills;
an extracting unit, configured to extract and separate the bills, to make the bills enter a bill channel in a separated manner;
an image capturing unit, configured to capture a single-bill image and a bill background image of an extracted bill;
a rolling unit, configured to roll the extracted bill to make the bill press multiple prearranged force sensors;
a force sensing unit, configured to acquire effective force signals fed back from the force sensors;
an image processing unit, configured to acquire an inclination angle of the bill based on the single-bill image and the bill background image;
an effectiveness determining unit, configured to determine, based on the inclination angle, the force sensor that is pressed by the bill as an effective force sensor;
a recognition unit, configured to judge whether the effective force signal of the effective force sensor meets a preset softness condition; and
a bill determining unit, configured to determine the bill as a soft bill if the effective force signal meets the preset softness condition.

Optionally, the force sensing unit may include:
a force signal acquiring subunit, configured to acquire original force signals generated by the force sensors in a process from that the bill starts to press the force sensors to that the bill leaves the force sensors; and
a force signal processing subunit, configured to calculate the effective force signals of the force sensors based on the original force signals.

Optionally, the recognition unit may include:
a first recognition subunit, configured to judge whether the effective force signal of each effective force sensor is less than the preset softness threshold;
a second recognition subunit, configured to judge whether the number of the effective force sensors of which the effective force signals are less than the preset softness threshold exceeds a half of the total number of the effective force sensors; and a third recognition subunit, configured to judge whether the effective force signal of at least one effective force sensor is less than the preset softness threshold.

Optionally, the device may further include:

an abnormity recognition unit, configured to judge whether the effective force signal of at least one effective force sensor is greater than a maximum value for new bill; and an abnormity determining unit, configured to determine the bill as an abnormal bill if it is judged by the abnormity recognition unit that the effective force signal of at least one effective force sensor is greater than a maximum value for new bill.

Optionally, the device may further include:

a picking unit, configured to pick out the soft bill and the abnormal bill.

It can be seen from the above technical solutions that, the embodiments of the present disclosure have the following advantages.

In the embodiments of the present disclosure, bills are received and are extracted and separated so as to enter a bill channel in a separated manner. Then, a single-bill image and a bill background image of each extracted bill are captured, the extracted bill is rolled to press multiple prearranged force sensors, and effective force signals fed back from the force sensors are acquired. Next, an inclination angle of the bill is acquired based on the single-bill image and the bill background image, and the force sensor that is pressed by the bill is determined as an effective force sensor based on the inclination angle. Finally, it is judged whether an effective force signal of the effective force sensor meets a preset softness condition, and the bill is determined as a soft bill if the effective force signal meets the preset softness condition. In the embodiments of the present disclosure, by acquiring the single-bill image to calculate the inclination angle of the bill and by acquiring and calculating effective force signals of the multiple force sensors pressed by the bill, the softness degree of the bill is judged based on the preset softness condition, which is not interfered by a sound spreading speed and a noise. Therefore, it is effectively solved the issue of low accuracy, low speed and poor anti-interference performance of the existing detection of bill softness.

BRIEF DESCRIPTION OF THE DRAWINGS

FIG. 2.1 is a schematic diagram illustrating that a bill is in a bill-transmission channel and is about to enter a corner press force sensor;

FIG. 2.2 is a schematic diagram illustrating that a front end of the bill has entered a corner channel and a back end of the bill is about to press the force sensor;

FIG. 2.3 is a schematic diagram illustrating that the front end of the bill has entered the corner channel and the back end of the bill presses the force sensor;

FIG. 2.4 is a schematic diagram illustrate that the front end of the bill has entered the corner channel and the back end of the bill is about to leave the force sensor;

DETAILED DESCRIPTION

A bill softness recognition method and a bill softness recognition device are provided according to embodiments of the present disclosure, to solve an issue of low accuracy, low speed and poor anti-interference performance of the existing detection of bill softness.

In order that the objectives, features and advantages of the present disclosure can be clearer and easier to be understood, the technical solution according to the embodiments of the present disclosure will be described clearly and completely as follows in conjunction with the drawings in the embodiments of the present disclosure. It is apparent that the described embodiments are only a few rather than all of the embodiments according to the present disclosure. Any other embodiments obtained by those skilled in the art based on the embodiments in the present disclosure without any creative work fall in the scope of the present disclosure.

Figure 1:
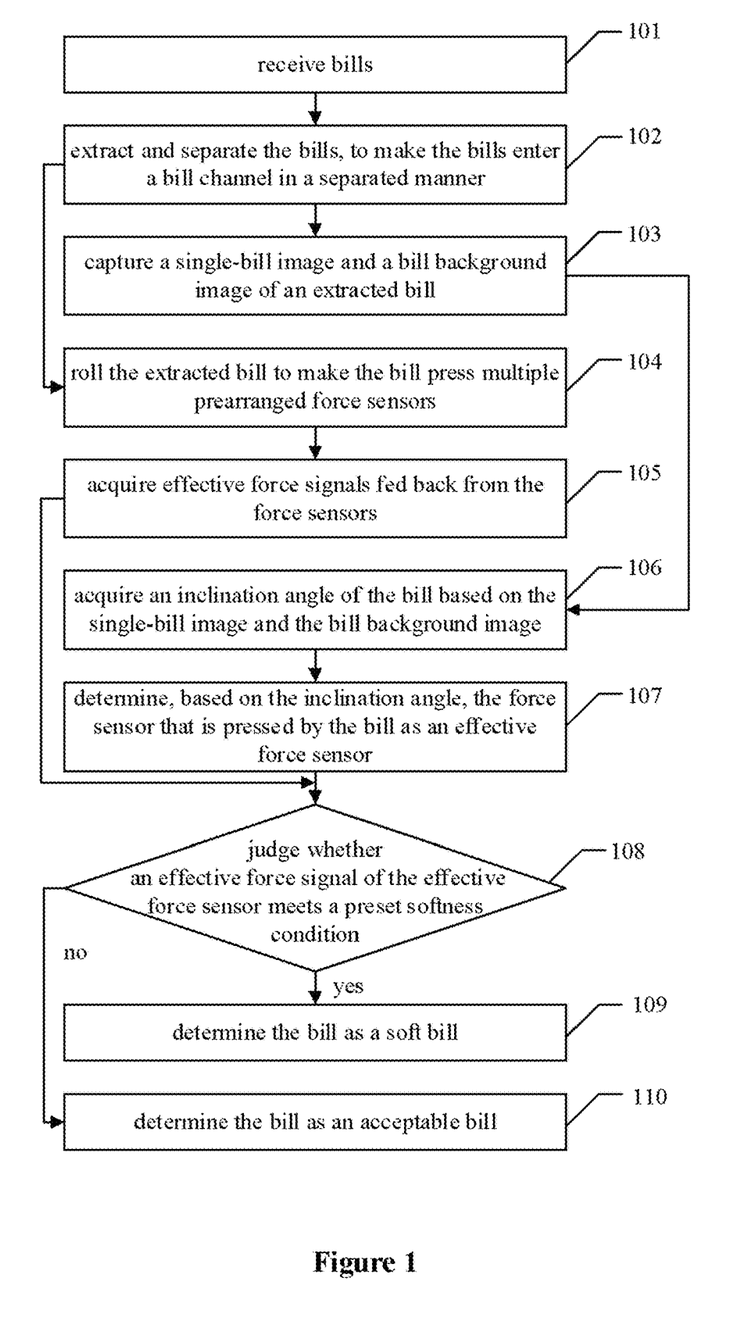
FIG. 1 is a flowchart of a bill softness recognition method according to an embodiment of the present disclosure.

Referring to FIG. 1, a bill softness recognition method according to an embodiment of the present disclosure includes the following steps 101-110.

In step 101, bills are received.

Firstly, bills are received.

In step 102, the bills are extracted and separated, so as to enter a bill channel in a separated manner.

After being received, the bills may be extracted and separated, so as to enter the bill channel in a separated manner.

In step 103, a single-bill image and a bill background image of an extracted bill are acquired.

After a bill is extracted and separated from others, the single-bill image and the bill background image of the extracted bill may be acquired.

In step 104, the bill is rolled to press multiple prearranged force sensors.

After the bill is extracted from the bills, the bill may be further rolled to press multiple prearranged force sensors.

In step 105, effective force signals fed back from the force sensors are acquired.

In the case that the multiple force sensors are pressed by the bill, the effective force signals fed back by the force sensors may be acquired.

In step 106, an inclination angle of the bill is acquired based on the single-bill image and the bill background image.

After the single-bill image and the bill background image of the extracted bill are acquired, the inclination angle of the bill may be acquired based on the single-bill image and the bill background image.

In step 107, the force sensor that is pressed by the bill is determined as an effective force sensor based on the inclination angle.

After the inclination angle is acquired, the force sensor that is pressed by the bill is determined as an effective force sensor based on the inclination angle. It can be understood that, some or all of the above force sensors may be the effective force sensors.

In step 108, it is judged whether the effective force signal of the effective force sensor meets a preset softness condition. If the effective force signal of the effective force sensor meets the preset softness condition, step 109 is performed, and if the effective force signal of the effective force sensor does not meet the preset softness condition, step 110 is performed.

After the effective force sensor is determined, it may be judged whether the effective force signal of the effective force sensor meets the preset softness condition. If the effective force signal of the effective force sensor meets the preset softness condition, step 109 is performed, and if the effective force signal of the effective force sensor does not meet the preset softness condition, step 110 is performed.

In step 109, the bill is determined as a soft bill.

If the effective force signal of the effective force sensor meets the preset softness condition, the bill is determined as a soft bill In step 110, the bill is determined as an acceptable bill.

If the effective force signal of the effective force sensor does not meet the preset softness condition, the bill is determined as an acceptable bill.

In the embodiment, bills are received. The bills are extracted and separated, so as to enter a bill channel in a separated manner. Then, a single-bill image of an extracted bill and a bill background image are captured, the extracted bill is rolled to press multiple prearranged force sensors, and effective force signals fed back from the force sensors are acquired. Next, an inclination angle of the bill is acquired based on the single-bill image and the bill background image and the force sensor that is pressed by the bill is determined as an effective force sensor based on the inclination angle. Finally, it is judged whether an effective force signal of the effective force sensor meets a preset softness condition, and the bill is determined as a soft bill if the effective force signal meets the preset softness condition. In the embodiment, by acquiring the single-bill image to calculate the inclination angle of the bill and by acquiring and calculating effective force signals of multiple force sensors pressed by the bill, the softness degree of the bill is judged based on the preset softness condition, which is not interfered by a sound spreading speed and a noise. Therefore, it is effectively solved the issue of low accuracy, low speed and poor anti-interference performance of the existing detection of bill softness.

For easy understanding, in the following, the bill softness recognition method according to the embodiment of the present disclosure is described in details with reference to FIGS. 2 to 11.

In the step of receiving bills, the bills are received into a machine.

The whole stack of bills are extracted and separated. When the bills are extracted and separated, the bills are separated as non-overlapped bills at a set speed to enter a bill channel. The bills are spaced at a preset interval to be coincident with a working beat of a subsequent unit. An extracting speed may be calculated with the following method. Assuming that the speed in which the machine processes the bills is 600 pieces per minute, a duration for processing each bill is 60/600=0.1S, that is, one bill is extracted per 0.1S to enter to the bill channel. If a speed in which the bill channel drives the bill is 2 m/s, the interval between the bills is 0.2 m.

Figure 3:
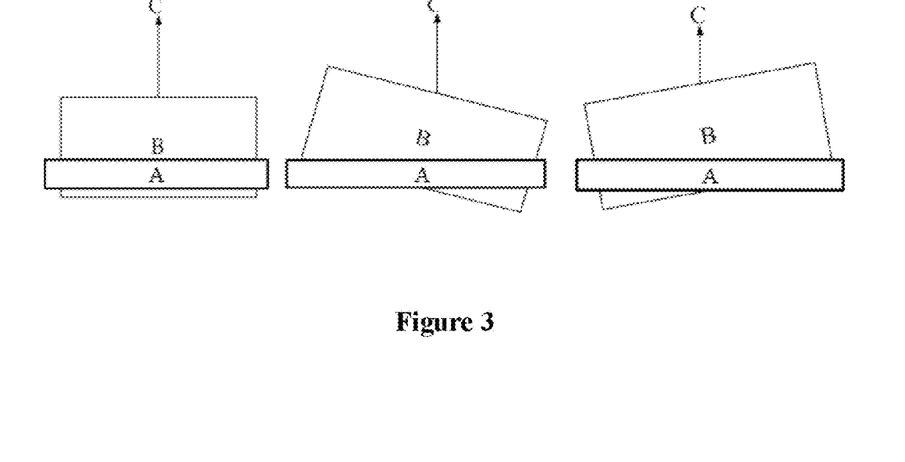
FIG. 3 is a schematic diagram of three different attitudes in which a bill passes an image sensor.

As shown in FIG. 3, the bills enter the bill channel after being extracted and separated. In FIG. 3, A represents an image sensor, which is preferably a touch image sensor. A direction in which the image sensor scans a bill is perpendicular to a direction in which the bill moves. In this way, it is easier to acquire an inclination angle of the bill. The inclination angle of the bill is an angle between a front edge of the bill and the moving direction. The images of each bill also include a background covering the entire bill, thereby facilitating the calculation of the inclination angle in a subsequent step. The image of the bill is preferably a visible light image or infrared light image.

As shown in FIG. 3, the bill may pass the image sensor in three different attitudes, i.e., non-incline, left-incline and right-incline. In the Figure, A represents an image sensor, B represents a bill and C represents a direction in which the bill moves.

Figure 4:
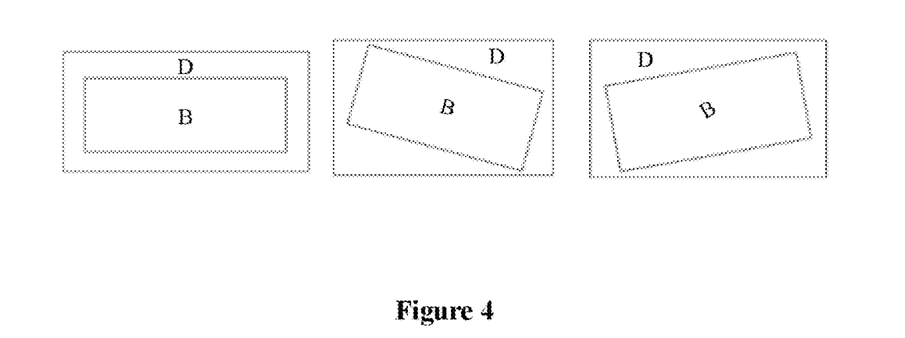
FIG. 4 is a schematic diagram of pictures of a bill in three attitudes obtained by the image sensor.

FIG. 4 is a schematic diagram showing pictures of a bill in three attitudes obtained by the image sensor. In the Figure, B represents a bill and D represents a background of the bill.

Figure 11:
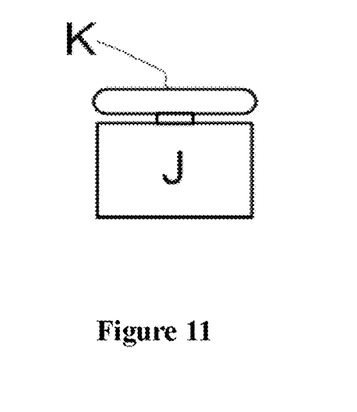
FIG. 11 is a schematic structural diagram of a force sensor.

After the bill image is acquired, the bill moves in the same speed and angle to contact and press a force sensor at the back-end in a next step. Each bill presses a fixed force senor in a fixed speed, angle and degree of curvature, and the force sensor acquires force signals generated by the force sensor at the points pressed by the bill. In the force sensor adopted in the present disclosure, an electric bridge is formed by integrating a Si semiconductor with a piezoresistor. When an external pressure is applied to a contact of the sensor, the contact directly transfers the pressure to the detecting piezoresistor. A resistance of the piezoresistor changes with the magnitude of the applied force, thereby changing an output voltage of the electric bridge. In FIG. 11, K represents a contact (detection point) of a force sensor, and J represents a housing of the sensor. When an external force is applied to the contact K of the force sensor, the contact directly transfer the pressure to a piezoresistor in the sensor, thereby changing the resistance of the piezoresistor and converting a force signal into an electric signal.

As shown in FIGS. 2.1, 2.2, 2.3 and 2.4, the bill presses the force sensor at a corner of 90 degrees of the bill-transmission channel. In the figures, 1 represents an image sensor, 2 represents a bill, 3 represents a force sensor and 4 represents a drive wheel. The bill is rolled under the driving of the drive wheel 4 and enters the corner of the bill-transmission channel. The distance between 3 and 4 is preset such that a distance between a tangent point of 2 on 4 and a center point of 3 is 38 mm.

Figure 21:
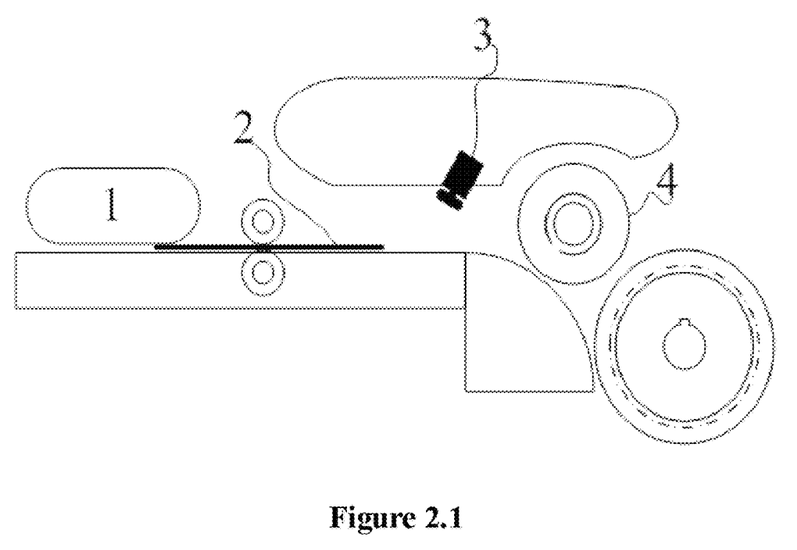

FIG. 2.1 shows that the bill is about to enter the corner to press the force sensor in the bill-transmission channel. The bill is driven by the driving wheel to enter the corner in the bill-transmission channel.

Figure 22:
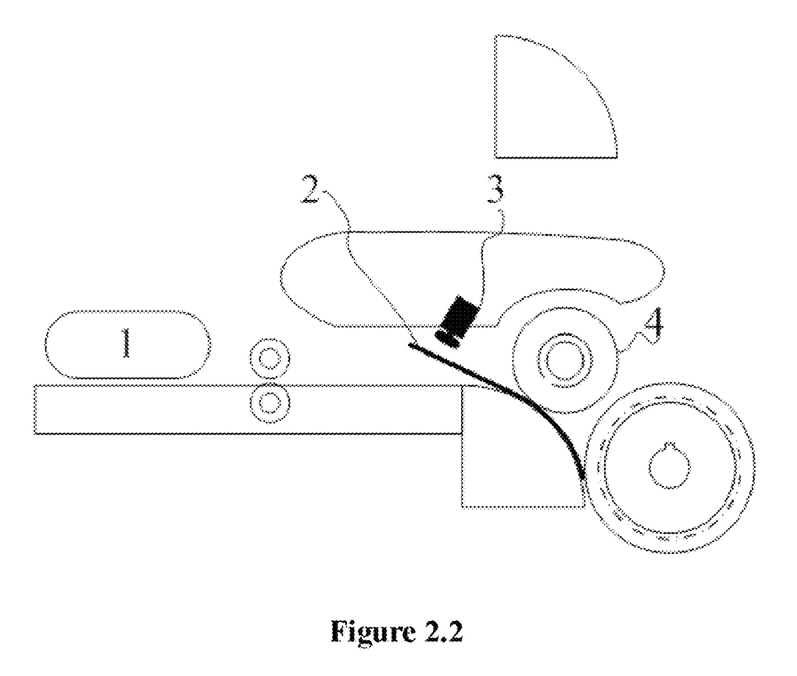

FIG. 2.2 shows that a front end of the bill has entered the corner channel under the driving of the driving wheel 4, and a back end of the bill is tilted so as to pat on a contact of the force sensor in a fixed speed and angle.

Figure 23:
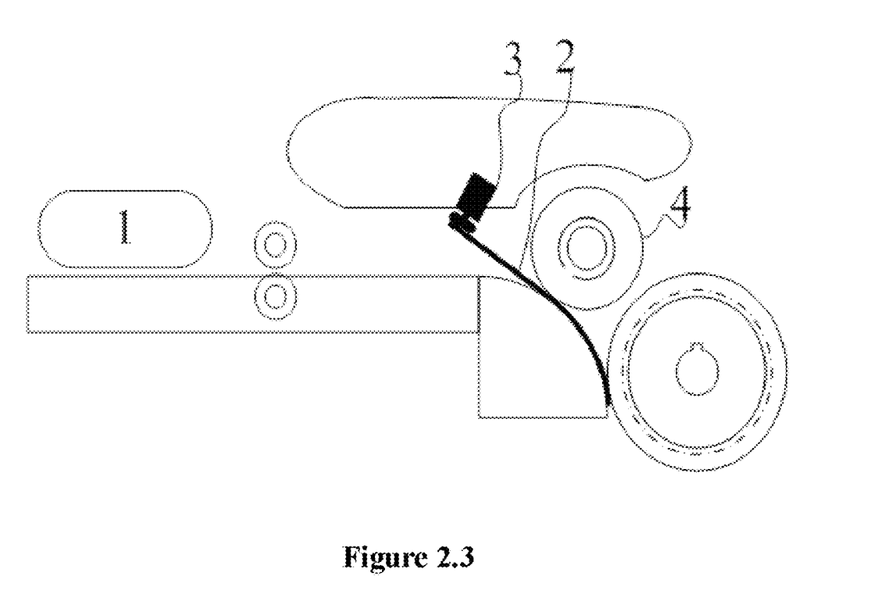

FIG. 2.3 shows that the back end of the bill presses the contact of the force sensor by means of rolling and applies a force to the contact of the force sensor. The bill is a flexible sheet-shaped object. In this case, the bill is deformed in the case that the back end of the bill presses the force sensor. That is, a certain elastic deformation force is generated and applied to the force sensor. Therefore, a resultant force of the patting force and elastic deformation force of the bill is applied to the force sensor, thereby forming a force signal detected by the force sensor.

Figure 24:
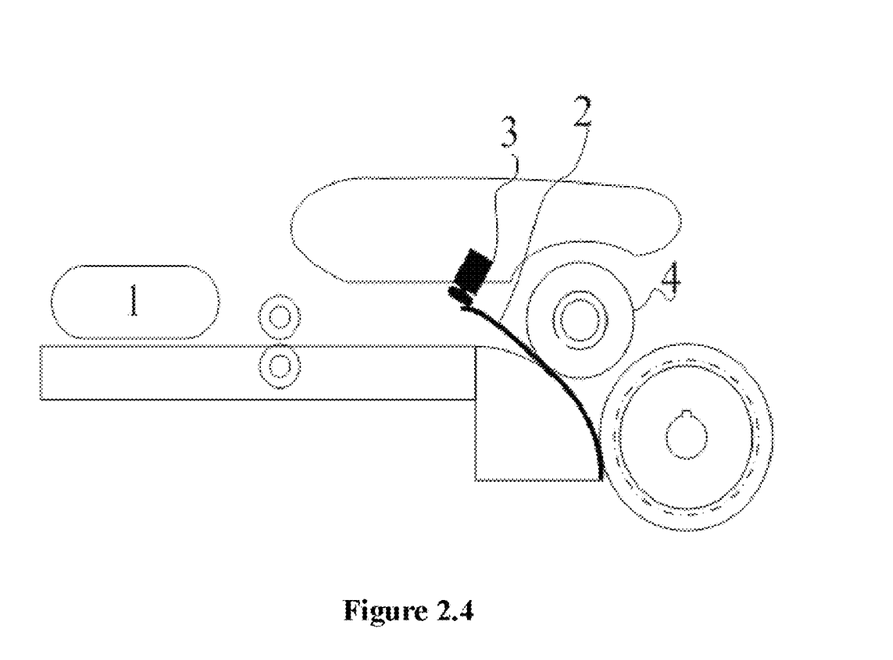

FIG. 2.4 shows that the bill is about to leave the force sensor under the driving of the driving wheel. At this point, a press process performed by the bill on the force sensor completes. The force sensor obtains original force signals generated in the process from that the bill starts to press the force sensor to that the bill leaves the force sensor.

Figure 5:
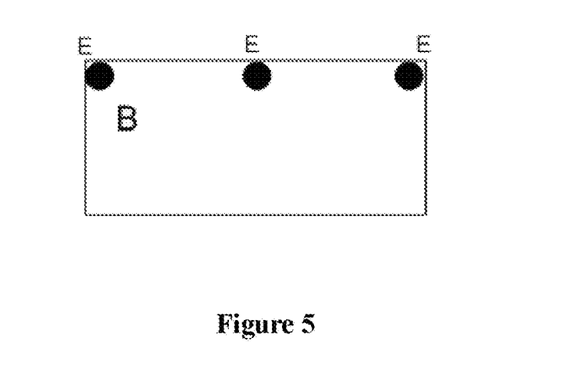
FIG. 5 is a schematic diagram showing that a bill does not incline, and presses all of three force sensors.
Figure 6:
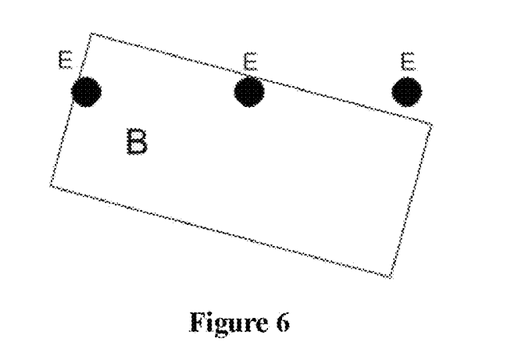
FIG. 6 is a schematic diagram showing that a bill inclines to right, and presses one or two force sensors on the left side.
Figure 7:
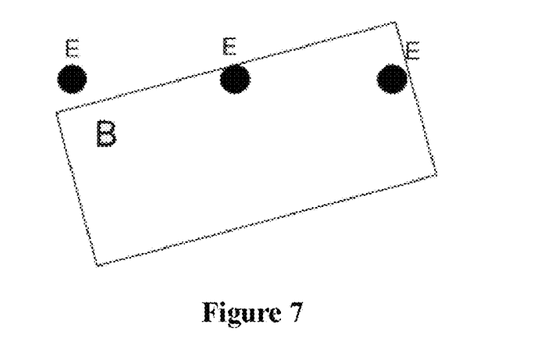
FIG. 7 is a schematic diagram showing that a bill inclines to left, and presses one or two force sensors on the right side.

In the embodiment, a principle of three attitudes in which the bill presses the force sensor is described with an example of three force sensors. In the figure, B represents a bill and E represents a force sensor.

As shown in FIG. 5, the bill does not incline and presses all of the three force sensors.

As shown in FIG. 6, the bill inclines to right and presses one or two force sensors on the left side.

As shown in FIG. 7, the bill inclines to left and presses one or two force sensors on the right side.

Figure 8:
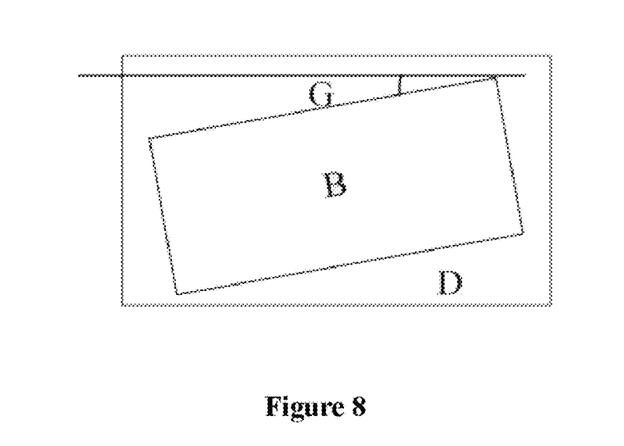
FIG. 8 is a schematic diagram of an inclination angle of a bill.

After being acquired, the images of the bill and the force signals are processed. As shown in FIG. 8, an inclination angle G of the bill may be calculated based on the acquired bill image B and the acquired bill background image D. It may be defined that the right-inclination is positive and the left-inclination is negative. In the case that the image inclines to right or left by less than 1 degree, the inclination angle G may be defined as 0.

Figure 9:
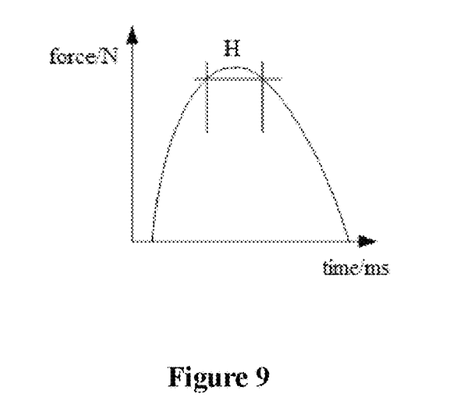
FIG. 9 is a schematic diagram of a force signal output by a force sensor.

The analog signal obtained by the force sensor is converted into a digital signal processible by a processing chip. In order to ensure a high distinction for bill softness, a 16-bit ADC chip is preferably adopted to convert the signal. In this case, if 2.048V is taken as a reference voltage, a resolution of 31 uV can be achieved, thereby ensuring a force resolution of 0.01 N. It takes time to complete the process from that the bill starts to press the force sensor to that the bill leaves the force sensor. That is, the detected analog signal is a signal during the process and needs to be sampled. FIG. 9 is a schematic diagram of force signals outputted by the force sensor in the process from that a single-bill starts to press the force sensor to that the bill leaves the force sensor. The ADC chip samples a segment H on the top of the curve in the figure for multiple times and calculates an average value as the effective signal of the force applied by the bill to the force sensor. With the same method, the effective signals of the force applied by the bill to the other two force sensors may be calculated.

Figure 10:
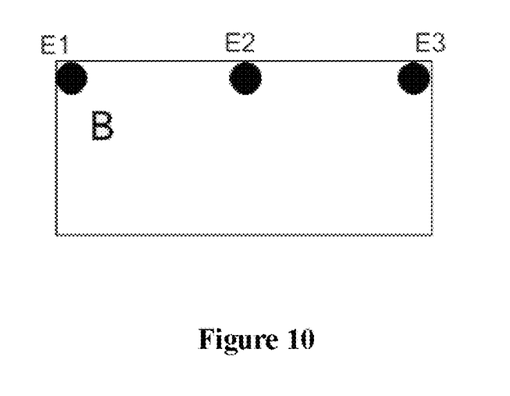
FIG. 10 is a schematic diagram of three positions at which a bill presses a force sensor.

The machine performs a comprehensive recognition and judgment on the multiple processed effective force signals and inclination angles. As shown in FIG. 10, E1, E2 and E3 at three locations respectively represent effective force signals obtained at the three locations, for which the following three modes may be defined based on the three attitudes of bill.

In the case that inclination angle is 0 degree, if the effective force signals of the three force sensors each are in an acceptable range from 0.26 N to 0.4 N (0.26 N is a minimum threshold value for a soft bill and 0.4 N is a maximum value for a new bill), the bill is judged as an acceptable bill. If the three effective force signals each are less than the set softness threshold value, the bill is judged as a soft bill. If one or two of the effective force signals are less than the softness threshold value, a judgment is performed in accordance with a preset strict level. In the strictest level, the bill is judged as a soft bill as long as one effective force signal is less than the set softness value. In the least strict level, the bill is judged as a soft bill only if all of the three effective force signals are less than the set softness threshold value. If one or more of the force signals are greater than the maximum value for a new bill, the bill is judged as an abnormal bill and is processed the same as a soft bill.

In the case that the bill inclines to right, a relationship between the effective force signals of the three force sensors is E1>E2>E3, where E3 may be equal to zero, i.e., the inclination angle of the bill is large and the bill does not presses the force sensor at the location corresponding to E3. The values of E1, E2 and E3 corresponding to different inclination angles are calculated based on the acceptable range from 0.26 N to 0.4 N corresponding to a zero inclination, to respectively obtain three value ranges. If all of the three values are within the acceptable range, the bill is determined as an acceptable bill. If all of the three values are less than the set softness threshold value, the bill is determined as a soft bill. If one or two of the effective force signals are less than the set softness threshold value, a judgment is performed in accordance with a preset strict level. In the strictest level, the bill is determined as a soft bill as long as one of the effective force signals is less than the set softness threshold value and the bill presses all of the three force sensors. In the case that a force sensor is not pressed at the location corresponding to E3, the bill is determined as an acceptable bill only if both of E1 and E2 are greater than the set softness threshold value. In the least strict level, the bill is determined as a soft bill only if all of the three effective force signals are less than the set softness threshold value. In the case that the force sensor is not pressed at the location corresponding to E3, i.e., E3=0, the bill is determined as a soft bill only if both of E1 and E2 are less than the softness threshold value. If one or more of the force signals are greater than the maximum value for a new bill, the bill is determined as an abnormal bill and is processed the same as a soft bill. In the case that the bill inclines to left, a relationship between effective force signals of the three force sensors is E1<E2<E3, where E1 may be equal to zero. In this case, a method for judging a soft bill is similar to that in the case of right inclination.

The processing chip controls a corresponding mechanism to make the bills enter different channels based on softness judgment results made on the bills, thereby picking out a soft bill and completing the softness recognition process.

In the above, a bill softness recognition method is mainly described. In the following, a bill softness recognition device is described in detail. A bill softness recognition device according to an embodiment of the present disclosure includes the following units.

A receiving unit is configured to receive bills.

An extracting unit is configured to extract and separate the bills to make the bills enter a bill channel in a separated manner.

An image capturing unit is configured to capture a single-bill image and a bill background image of each of the extracted bills.

A rolling unit is configured to roll the extracted bill to make the bill press multiple prearranged force sensors.

A force sensing unit is configured to acquire effective force signals fed back from the force sensors.

An image processing unit is configured to acquire an inclination angle of the bill based on the single-bill image and the bill background image.

An effectiveness determining unit is configured to determine, based on the inclination angle, the force sensor that is pressed by the bill as an effective force sensor.

A recognition unit is configured to judge whether the effective force signal of the effective force sensor meets a preset softness condition.

A bill determining unit is configured to determine the bill as a soft bill if the effective force signal meets the preset softness condition.

Preferably, the force sensing unit may include a force signal acquiring subunit and a force signal processing subunit.

The force signal acquiring subunit is configured to acquire original force signals generated by the force sensors in a process from that the bill starts to press the force sensors to that the bill leaves the force sensors.

The force signal processing subunit is configured to calculate the effective force signals of the force sensors based on the original force signals.

Preferably, the recognition unit may include a first recognition subunit, a second recognition subunit, and a third recognition subunit.

The first recognition subunit is configured to judge whether the effective force signal of each effective force sensor is less than the preset softness threshold.

The second recognition subunit is configured to judge whether the number of effective force sensors of which the effective force signals are less than the preset softness threshold exceeds a half of the total number of the effective force sensors.

The third recognition subunit is configured to judge whether the effective force signal of at least one effective force sensor is less than the preset softness threshold.

Preferably, the bill softness recognition device may further include an abnormity recognition unit and an abnormity determining unit.

The abnormity recognition unit is configured to judge whether the effective force signal of at least one effective force sensor is greater than a maximum value for new bill; and The abnormity determining unit is configured to determine the bill as an abnormal bill if it is judged by the abnormity recognition unit that the effective force signal of at least one effective force sensor is greater than the maximum value for new bill.

Preferably, the bill softness recognition device may further include a picking unit.

The picking unit is configured to separate the soft bill and the abnormal bill.

In the embodiment, firstly, the receiving unit receives bills. The extracting unit extracts and separates the bills, to make the bills enter a bill channel in a separated manner. Then, the image capturing unit captures a single-bill image and a bill background image of an extracted bill. The rolling unit rolls the bill to make the bill press multiple prearranged force sensors. Next, the force sensing unit acquires effective force signals fed back from the force sensors. The image processing unit acquires an inclination angle of the bill based on the single-bill image and the bill background image. The effectiveness determining unit determines an effective force sensor pressed by the bill based on the inclination angle. Finally, the recognition unit judges whether an effective force signal of the effective force sensor meets a preset softness condition. The bill determining unit determines the bill as a soft bill if it is judged by the recognition unit that the effective force signal of the effective force sensor meets the preset softness condition. In the embodiment, by acquiring the single-bill image to calculate the inclination angle of the bill and by acquiring and calculating effective force signals of the multiple force sensors pressed by the bill, the softness degree of the bill is judged based on the preset softness condition, which is not interfered by a sound spreading speed and a noise. Therefore, it is effectively solved the issue of low accuracy, low speed and poor anti-interference performance of the existing detection of bill softness.

For easy understanding, in the following, the bill softness recognition apparatus according to the embodiment of the present disclosure is described in details with reference to FIGS. 2 to 11.

The receiving unit is configured to receive bills.

The extracting unit is configured to extract and separate the whole stack of bills. When the bills are extracted and separated, the bills are separated as non-overlapped bills at a set speed to enter a bill channel. The bills are spaced at a preset interval to be coincident with a working beat of a subsequent unit. An extracting speed may be calculated with the following method. Assuming that the speed in which the machine processes the bills is 600 pieces per minute, a duration for processing each bill is 60/600=0.1S, that is, one bill is extracted per 0.1S to enter to the bill channel. If a speed in which the bill channel drives the bill is 2 m/s, the interval between the bills is 0.2 m.

The image capturing unit is configured to capture a single-bill image and a bill background image of the extracted bill. As shown in FIG. 3, A represents an image sensor, which is preferably a touch image sensor. A direction in which the image sensor scans a bill is perpendicular to a direction in which the bill moves. In this way, it is easier to acquire an inclination angle of the bill. The inclination angle of the bill is an angle between a front edge of the bill and the moving direction. The image of each bill also includes a background covering the entire bill, thereby facilitating the calculation of the inclination angle in a subsequent step. The image of the bill is preferably a visible light image or infrared light image.

As shown in FIG. 3, a bill passes the image sensor in three different attitudes: non-incline, left-incline and right-incline. In the Figure, A represents the image sensor, B represents the bill and C represents the direction in which the bill moves.

FIG. 4 is a schematic diagram showing pictures of a bill in the three attitudes, obtained by the image sensor. In the Figure, B represents a bill and D represents a background of the bill.

After the images of the bill are acquired, the rolling unit makes the bill moves in the same speed and angle to contact and press a force sensor at the back-end in a next step. Each bill presses a fixed force senor in a fixed speed, angle and degree of curvature, and the force sensing unit acquires force signals generated by the force sensor at the points pressed by the bill.

In the force sensor adopted in the present disclosure, an electric bridge is formed by integrating a Si semiconductor with a piezoresistor. When an external pressure is applied to a contact of the sensor, the contact directly transfers the pressure to the detecting piezoresistor. The resistance of the piezoresistor changes with the magnitude of the applied force, thereby changing an output voltage of the electric bridge. In FIG. 11, K represents a contact (detection point) of a force sensor and J represents a housing of the sensor. When an external force is applied to the contact K of the force sensor, the contact directly transfers the pressure to a piezoresistor in the sensor, thereby changing the resistance of the piezoresistor and converting a force signal into an electric signal.

As shown in FIGS. 2.1, 2.2, 2.3 and 2.4, the bill presses the force sensor at a corner of 90 degrees of the bill-transmission channel. In the figures, 1 represents an image sensor, 2 represents a bill, 3 represents a force sensor and 4 represents a drive wheel. The bill is rolled under the driving of the drive wheel 4 and enters the corner of the bill-transmission channel. The distance between 3 and 4 is preset such that a distance between a tangent point of 2 on 4 and a center point of 3 is 38 mm.

FIG. 2.1 shows that the bill is about to enter the corner to press the force sensor in the bill-transmission channel. The bill is driven by the driving wheel to enter the corner in the bill-transmission channel.

FIG. 2.2 shows that a front end of the bill has entered the corner channel under the driving of the driving wheel 4 and a back end of the bill is tilted to pat on a contact of the force sensor with a fixed speed and angle.

FIG. 2.3 shows that the back end of the bill presses the contact of the force sensor by means of rolling and applies a force to the contact of the force sensor. The bill is a flexible sheet-shaped object. In this case, the bill is deformed in the case that the back end of the bill has pressed the force sensor. That is, a certain elastic deformation force is generated and applied to the force sensor. Therefore, a resultant force of the patting force and elastic deformation force of the bill is applied to the force sensor, thereby forming a force signal to be detected by the force sensor.

FIG. 2.4 shows that the bill is about to leave the force sensor under the driving of the driving wheel. At this point, a press process performed by the bill on the force sensor completes. The force sensor obtains original force signals generated in the process from that the bill starts to press the force sensor to that the bill leaves the force sensor.

In the embodiment, a principle of three attitudes in which the bill presses the force sensor is described with an example of three force sensors. In the figure, B represents a bill and E represents a force sensor.

As shown in FIG. 5, the bill does not incline, and presses all of the three force sensors.

As shown in FIG. 6, the bill inclines to right and presses one or two force sensors on the left side.

As shown in FIG. 7, the bill inclines to left and presses one or two force sensors on the right side.

After the single-bill image, bill background image and force signal are respectively captured by the image capturing unit and force sensing unit, the images of the bill are processed by the image processing unit. As shown in FIG. 8, an inclination angle G of the bill may be calculated based on the acquired single-bill image B and the bill background image D. It may be defined that the right-inclination is positive and the left-inclination is negative. In the case that the image inclines to left or right by less than 1 degree, the inclination angle G may be defined as 0.

An obtained analog signal may be converted into a digital signal processible by a processing chip, by the force signal acquisition subunit of the force sensing unit. In order to ensure a high distinction for bill softness, a 16-bit ADC chip is preferably adopted to convert the signal. In this case, if 2.048V is taken as a reference voltage, a resolution of 31 uV can be achieved, thereby ensuring a force resolution of 0.01 N. It takes time to complete the process from that the bill starts to press the force sensor to that the bill leaves the force sensor. That is, the detected analog signal is a signal during the process and needs to be sampled by the force signal processing subunit. FIG. 9 is a schematic diagram of force signals outputted by the force sensor in a process from that a single-bill starts to press the force sensor to that the bill leaves the force sensor. The ADC chip samples a segment H on the top of the curve in the figure for multiple times and calculates an average value as the effective signal of the force applied by the bill to the force sensor. With the same method, the effective signals of the force applied by the bill to the other two force sensors may be further calculated.

The effectiveness determining unit determines an effective force sensor pressed by the bill based on the inclination angle, and the recognition unit performs a comprehensive recognition and judgment based on an effective force signal of the effective force sensor. As shown in FIG. 10, E1, E2 and E3 at three locations respectively represent effective force signals obtained at the three locations, for which the following three modes may be defined based on the three attitudes of bill In the case that the inclination angle is 0 degree, if the effective force signals of the three force sensors each are in an acceptable range from 0.26 N to 0.4 N (0.26 N is a minimum threshold value for a soft bill and 0.4 N is a maximum value for a new bill), the bill is judged as an acceptable bill. If the three effective force signals each are less than the set softness threshold value, the bill is judged as a soft bill. If one or two of the effective force signals are less than the softness threshold value, a judgment is performed in accordance with a preset strict level. In the strictest level, the bill is judged as a soft bill as long as one of the effective force signals is less than the set softness threshold value. In the least strict level, the bill is judged as a soft bill only if all of the three effective force signals are less than the set softness threshold value. If one or more of the force signals are greater than the maximum value for a new bill, the bill is judged as an abnormal bill and is processed the same as a soft bill.

In the case that the bill inclines to right, a relationship between the effective force signals of the three force sensors is E1>E2>E3, where E3 may be equal to zero, i.e., the inclination angle of the bill is large and the bill does not presses the force sensor at the location of E3. The values of E1, E2 and E3 corresponding to different inclination angles are calculated based on the acceptable range from 0.26 N to 0.4 N corresponding to a zero inclination, to respectively obtain three value ranges. If all of the three values are within the acceptable range, the bill is judged as an acceptable bill. If all of the three values are less than the set softness threshold value, the bill determining unit determines the bill as a soft bill. If one or two of the effective force signals are less than the set softness threshold value, a judgment is performed in accordance with a preset strict level. In the strictest level, the bill determining unit determines the bill as a soft bill as long as one of the effective force signals is less than the set softness threshold value and the bill presses all of the three force sensors. In the case that a force sensor is not pressed at the location corresponding to E3, the bill is judged as an acceptable bill only if both of E1 and E2 are greater than the set softness threshold value. In the least strict level, the bill is judged as a soft bill only if all of the three effective force signals are less than the set softness threshold value. In the case that the force sensor is not pressed at the location corresponding to E3, i.e., E3=0, the bill is determined as a soft bill only if both of E1 and E2 are less than the softness threshold value. The abnormity recognition unit judges whether one or more of the force signals are greater than the maximum value for a new bill, and the abnormity determining unit determines the bill as an abnormal bill and processes the bill in the same way as processing a soft bill.

In the case that the bill inclines to left, a relationship between effective force signals of the three force sensors is E1<E2<E3, where E1 may be equal to zero. In this case, a method for judging a soft bill is similar to that in the case of right inclination.

The processing chip controls a corresponding structure to make the bills enter different channels based on softness judgment results made on the bills. The picking unit picks out the soft bill and abnormal bill, to complete the softness recognition process.

The recognition method and recognition device according to the present disclosure can be implemented simply and has low requirements on structure. It is only needed to make a small modification on the structure of a most common financial bill machine. By installing a required number of force sensors and corresponding circuits according to an actual bill acquisition requirement, and adding corresponding recognition control algorithm software to a processor of an existing bill recognition unit, the detection and recognition of bill softness can be implemented. The recognition method according to the present disclosure has a high anti-interference performance, i.e., the detection is not affected by noises and vibration generated by other components. Furthermore, the recognition method needs less amount of information to be detected, and has a rapid system response, recognizing bill softness more rapidly, steadily and accurately than the existing method based on sound.

It may be clearly understood by those skilled in the art that, for a convenient and concise description, for specific working processes of the above system, device and unit, one may refer to corresponding processes of the embodiments of the aforementioned method, which will not be described herein.

In the several embodiments provided by the present application, it should be understood that, the disclosed system, device and method may be implemented in other manners. For example, the embodiments of device described above are only for illustration. For example, the division of the unit is only a logic function division, and there may be other division modes in a practical implementation. For example, multiple units or components may be combined or may be integrated to another system, or some features may be omitted or not performed. On the other hand, the displayed or discussed coupling, direct coupling or communication connection between each other may be an indirect coupling or communication connection through some interfaces, devices or units, and may be electrical, mechanical or in other forms.

The units described as separate components may be or may be not separated in physical, and the component displayed as a unit may be or may be not a physical unit. That is, the units may be located at the same place or may be distributed on multiple network units. Parts or all of the units may be selected to achieve the object of the embodiment scheme as needed.

In addition, the function units according to the embodiments of the present application may be integrated in one processing unit, or each of the units may exist independently as a physical unit, or two or more units may be integrated in one unit. The above unit integration may be realized by hardware or a software function unit.

In the case that the unit is integrated in form of software function unit and is sold or used as an independent product, the unit may be stored in a computer readable storage medium. Based on the above understanding, the essence of the technical solution of the present application, or the part of the technical solution contributing to the prior art, or all or parts of the technical solution may be embodied in form of software production. The computer software product is stored in a storage medium, including some instructions enabling a computer device (may be a personal computer, a server, a network device, or the like) to perform all or parts of steps of the method according to the embodiments of the present application. The above storage medium includes various mediums which may store a program code, such as a U disk, a removable hard disk, a Read-Only Memory (ROM), a Random Access Memory (RAM), a magnetic disk or an optical disk.

The above embodiments are only for illustrating the technical solution, and are not intended to limiting. Although the present disclosure is described in detail with reference to the aforementioned embodiments, it should be understood by those skilled in the art that, modifications can still be made to the technical solutions according to the embodiments, or equivalent substitutions can be made to some technical features. These modifications and substitutions do not make technical solutions depart from the spirits and scopes of the technical solutions according to the embodiments of the present disclosure.

The invention claimed is:

1. A bill softness recognition method, comprising:
receiving bills;
extracting and separating the bills to make the bills enter a bill channel in a separated manner;
capturing a single-bill image and a bill background image of each of the extracted bills;
rolling, under a driving force of a driving wheel, the extracted bill to make the bill enter a corner in a bill-transmission channel, and to make the bill press a plurality of prearranged force sensors;
acquiring effective force signals fed back from the force sensors, wherein the force sensor is not attached to the driving wheel but rather precedes the driving wheel, and the force sensor is activated when a force of the bill is applied to the force sensor by the bill-transmission channel and the arrangement of the driving wheels;
acquiring an inclination angle of the bill based on the single-bill image and the bill background image;
determining, based on the inclination angle, the force sensor that is pressed by the bill as an effective force sensor; and
judging whether the effective force signal of the effective force sensor meets a preset softness condition, and determining the bill as a soft bill if the effective force signal meets the preset softness condition.

2. The method according to claim 1, wherein the acquiring the effective force signals fed back from the plurality of force sensors comprises:
acquiring original force signals generated by the force sensors in a process from that the bill starts to press the force sensors to that the bill leaves the force sensors; and
calculating the effective force signals of the force sensors based on the original force signals.

3. The method according to claim 1, wherein the judging whether the effective force signal of the effective force sensor meets the preset softness condition, and determining the bill as a soft bill if the effective force signal meets the preset softness condition comprises:
determining the bill as a soft bill if the effective force signal of each effective force sensor is less than the preset softness threshold;
determining the bill as a soft bill if the number of the effective force sensors of which the effective force signals are less than the preset softness threshold exceeds a half of the total number of the effective force sensors; or determining the bill as a soft bill if the effective force signal of at least one effective force sensor is less than the preset softness threshold.

4. The method according to claim 3, further comprising: determining the bill as an abnormal bill if the effective force signal of at least one effective force sensor is greater than a maximum value for new bill.

5. The method according to claim 4, further comprising: picking out the soft bill and the abnormal bill.

6. A bill softness recognition device, comprising:
a receiving unit, configured to receive bills;
an extracting unit, configured to extract and separate the bills to make the bills enter a bill channel in a separated manner;
an image capturing unit, configured to capture a single-bill image and a bill background image of each of the extracted bills;
a driving wheel, configured to roll the extracted bill to make the bill enter a corner in a bill-transmission channel, and to make the bill press a plurality of prearranged force sensors;
a force sensing unit, configured to acquire effective force signals fed back from the plurality of force sensors, wherein the force sensor is not attached to the driving wheel but rather precedes the driving wheel, and the force sensor is activated when a force of the bill is applied to the force sensor by the bill-transmission channel and the arrangement of the driving wheels;
an image processing unit, configured to acquire an inclination angle of the bill based on the single-bill image and the bill background image;
an effectiveness determining unit, configured to determine, based on the inclination angle, the force sensor that is pressed by the bill as an effective force sensor;
a recognition unit, configured to judge whether the effective force signal of the effective force sensor meets a preset softness condition; and
a bill determining unit, configured to determine the bill as a soft bill if the effective force signal meets the preset softness condition.

7. The device according to claim 6, wherein the force sensing unit comprises:
a force signal acquiring subunit, configured to acquire original force signals generated by the force sensors in a process from that the bill starts to press the force sensors to that the bill leaves the force sensors; and
a force signal processing subunit, configured to calculate the effective force signals of the force sensors based on the original force signals.

8. The device according to claim 6, wherein the recognition unit comprises:
a first recognition subunit, configured to judge whether the effective force signal of each effective force sensor is less than the preset softness threshold;
a second recognition subunit, configured to judge whether the number of the effective force sensors of which the effective force signals are less than the preset softness threshold exceeds a half of the total number of the effective force sensors; and
a third recognition subunit, configured to judge whether the effective force signal of at least one effective force sensor is less than the preset softness threshold.

9. The device according to claim 8, further comprising:
an abnormity recognition unit, configured to judge whether the effective force signal of at least one effective force sensor is greater than a maximum value for new bill; and
an abnormity determining unit, configured to determine the bill as an abnormal bill if it is judged by the abnormity recognition unit that the effective force signal of at least one effective force sensor is greater than the maximum value for new bill.

10. The device according to claim 9, further comprising:
a picking unit, configured to pick out the soft bill and the abnormal bill.

\* \* \* \* \*